United States Patent

Nakagawa

[11] Patent Number: 6,061,105
[45] Date of Patent: May 9, 2000

[54] LCD WITH VIA CONNECTIONS CONNECTING THE DATA LINE TO A CONDUCTING LINE BOTH BEFORE AND BEYOND THE SEALING MATERIAL

[75] Inventor: Yoshiki Nakagawa, Kyoto, Japan

[73] Assignee: International Business Machines Corporation, Armonk, N.Y.

[21] Appl. No.: 09/293,681

[22] Filed: Apr. 16, 1999

[30] Foreign Application Priority Data

Apr. 16, 1998 [JP] Japan .................................. 10-106416

[51] Int. Cl.[7] ...................... G02F 1/1333; G02F 1/1343; G02F 1/1339
[52] U.S. Cl. .............................. 349/40; 349/153; 349/139
[58] Field of Search ................................ 349/40, 54, 192, 349/149, 153, 139

[56] References Cited

U.S. PATENT DOCUMENTS

| 5,532,853 | 7/1996 | Song et al. ................................ 349/149 |
| 5,684,547 | 11/1997 | Park et al. ................................ 359/59 |
| 5,930,607 | 7/1999 | Satou ........................................ 349/40 |

FOREIGN PATENT DOCUMENTS 9-152620  6/1907  Japan .
5-134261  5/1993  Japan .
8-29794   2/1996  Japan .

*Primary Examiner*—William L. Sikes
*Assistant Examiner*—Heidi L. Eisenhut
*Attorney, Agent, or Firm*—Scully, Scott, Murphy & Presser; Jay P. Sorollini, Esq.

[57] ABSTRACT

The present invention provides a liquid crystal display device that can eliminate an electrostatic discharge problem resulting from a high dielectric constant filler that is appropriate for improved shape stability of a sealing material. More particularly, the present invention is directed to sealing material 40 disposed between an array substrate 10 and an opposing substrate 12 contains a resin material and an inorganic dielectric filler. The filler consists of talc, mica or alumina having a dielectric constant higher than that of the resin material, and has plate-like or variable shape. The array substrate 10 includes gate lines 26 and data lines 24 that are separated by an insulating layer 28. The gate lines 26 or the data lines 24 that lie on the surface of the insulating layer 28 on the side of the sealing material 40 (e.g., the data lines 24) are led to the surface of the insulating layer 28 opposite the sealing material 40 through vias 62 in the insulating layer 28 and conductive lines 60, before the data lines 24 reach the location of the sealing material 40. Therefore, at the location of the sealing material 40, the data lines 24 are separated from the sealing material 40 by the insulating layer 28, and an electrostatic discharge that occurs through the sealing material 40 can be prevented.

11 Claims, 4 Drawing Sheets

LCD WITH VIA CONNECTIONS CONNECTING THE DATA LINE TO A CONDUCTING LINE BOTH BEFORE AND BEYOND THE SEALING MATERIAL

BACKGROUND OF THE INVENTION

1. Technical Field

The present invention relates to a liquid crystal display device, and in particular to an active matrix liquid crystal display device which can prevent destruction due to an electrostatic discharge through a sealing material.

2. Prior Art

First, the structure of a prior active matrix liquid crystal display device will be explained referring to FIGS. 1 to 5. FIG. 1(A) is a top view of an active matrix liquid crystal display device having an array substrate 10 and a color filter (CF) substrate, i.e., an opposing substrate 12, and FIG. 1(B) is a side view. FIG. 2 is a diagram showing the structure of the array substrate 10. FIG. 3 is a cross-sectional view of the liquid crystal display device at the position indicated by an arrow delimited line 3—3 in FIG. 2; FIG. 4 is a cross-sectional view of the liquid crystal display device at the position indicated by an arrow delimited line 4—4 in FIG. 2; and FIG. 5 is a cross-sectional view of the liquid crystal display device at the position indicated by an arrow delimited line 5—5 in FIG. 2.

As is shown in FIG. 2, the array substrate 10 includes an array of display electrodes or pixel electrodes 16 that are formed on a glass support substrate 11, and thin-film transistors (TFTs) 14 provided correspondingly to the pixel electrodes 16. The pixel electrodes 16 are made of transparent metal, such as indium tin oxide (ITO). In this prior art, as is shown in FIG. 3, each of the TFTs 14 has an inverted staggered structure in which a gate electrode 18 is disposed below a semiconductor layer 19. The gate electrodes 18 are formed on the support substrate 11, and connected to gate lines 26, which are also formed on the support substrate 11. The gate lines 26 extend in horizontal direction outward beyond the location of a sealing material 40, and are connected to terminal connecting pads 38 for outer lead bonding (OLB). A silicon oxide insulating layer 28, which also serves as a gate insulating layer, is formed on the gate electrodes 18 and the gate lines 26. The semiconductor layer 19, made of amorphous silicon or polycrystalline silicon, is formed at a position corresponding to that of the gate electrode 18. A drain electrode 20 and a source electrode 22 are formed in contact with the semiconductor layer 19. The source electrode 22 is connected to the associated pixel electrode 16. The entire surface, excluding the pixel electrodes 16, is covered by an insulating layer 30 such as silicon nitride.

As is shown in FIG. 2, the drain electrodes 20 are connected to data lines 24, which extend in vertical direction outward beyond the location of the sealing material 40, and are connected to terminal connecting pads 36 for OLB. The pads 36 and 38 are connected to a TAB circuit substrate in order to drive and control the liquid crystal.

The opposing substrate 12 includes a common electrode 34 made of transparent metal, such as ITO, that is formed on a support substrate 13 such as a glass substrate, and a color filter (not shown). The opposing substrate 12 is disposed at a predetermined distance opposite the array substrate 10. The polymer sealing material 40, such as epoxy resin, is so located that it surrounds a display area which includes the pixel electrodes 16 and the TFTs 14. The sealing material 40 normally contains glass filament spacers for establishing the distance between the array substrate 10 and the opposing substrate 12. A liquid crystal material 32 is introduced into the area sealed by the sealing material 40.

As is shown in FIGS. 4 and 5, the insulating layer 28 extends outward beyond the location of the sealing material 40 to the vicinity of the pads 36 and 38, and serves as a lower protective insulating layer that protects the gate lines 26 and separates the gate lines 26 and the data lines 24. The insulating layer 30 serves as an upper protective insulating layer that protects the surface of the array substrate 10. The upper insulating layer 30 also extends beyond the location of the sealing material 40 to the vicinity of the pads 36 and 38. The sealing material 40 positionally overlaps the common electrode 34.

It has been found that a liquid crystal display device tends to accumulate an electrostatic charge during the fabrication process, or during a period from the fabrication to installation in a final product, such as a personal computer, and causes an electrostatic discharge through the sealing material 40. Such an electrostatic discharge occurs only between the common electrode 34 and the data line 24, and does not occur between the common electrode 34 and the gate line 26. As is apparent from FIG. 4, the gate lines 26 are positioned between the lower insulating layer 28 and the support substrate 11, and the two insulating layers 28 and 30 exist between the sealing material 40 and the gate lines 26. On the other hand, the data lines 24 are positioned between the insulating layers 28 and 30, and only the insulating layer 30, which is about 1000 Å thick, is present between the sealing material 40 and the data lines 24. Therefore, an electrostatic discharge occurs preferentially between the common electrode 34 and the data line 24. It has been found that the electrostatic discharge occurs even when an insulating layer 30 as thick as 2000 Å is employed.

The electrostatic discharge occurs between the common electrode 34 and the data line 24 through the sealing material 40 and the upper insulating layer 30. When an electrostatic discharge occurs, the thin data lines 24 may be destroyed, or a short-circuit may occur between the common electrode 34 and the data line 24 due to the carbonization of the resin in the discharge path and/or due to the dispersion of data line metal. This results in a reduction in the yield.

As a result of analysis, it has been found that the dielectric constant of a particulate filler mixed in the resin sealing material, the shape and the size of the filler, and the distribution of the filler in the sealing material are related to the electrostatic discharge. To form the sealing material, for example, a seal application tool extrudes a resin material and applies it in a frame shape to one substrate, then places the other substrate thereon and compresses the seal material. Generally, a filler consisting of an inorganic dielectric material is mixed with the resin in order to ensure the stability of the shape of the sealing material after it is applied to or compressed on the substrate. When the width of the sealing material is not uniform after it has been compressed, a margin space large enough to accommodate the change in the width of the sealing material must be provided between the sealing material and the outermost pixels, and the effective display area can not be increased. The employment of a filler, therefore, is required to provide better control of the shape of the sealing material.

Typically, silica particles are used as the filler. Silica is generally spherical because of its inherent crystal structure. A spherical filler, however, is not so good in terms of the control of the shape of the sealing material. To improve the shape controllability, a plate-like filler such as talc

[Mg$_3$Si$_4$O$_{10}$(OH)$_2$] or a filler of variable or irregular shape, such as alumina, is preferable. Of these, the plate-like filler is more desirable. However, these fillers have a dielectric constant that is higher than that of the resin material, and may cause a problem of electrostatic discharges, which seldom occur with a silica filler.

Although the mechanism of the electrostatic discharge through the sealing material is not yet fully understood, the mechanism is considered to be based on the following. Silica has a dielectric constant (approximately 3.5 to 4.5) that is similar to the dielectric constant (approximately 3.5 to 5.0) of epoxy resin, which is a sealing material. Therefore, even when silica particles are distributed unevenly in the epoxy resin, the dielectric constant of the sealing material is substantially uniform, and accordingly the potential distribution is also uniform. On the other hand, since the dielectric constant of talc is approximately 9 and the dielectric constant of alumina is approximately 8 to 10, these are considerably higher than the dielectric constant of epoxy resin. Furthermore, when a plate-like filler or a filler of variable shape is employed, the size of the filler must be increased to a degree in order to preferably control the shape of the sealing material. A large filler tends to be non-uniformly distributed in the sealing material. Thus, when a filler such as talc or alumina is distributed non-uniformly in epoxy resin, the dielectric constant of the sealing material is non-uniform and the potential distribution is also non-uniform.

FIG. 6 is a schematic diagram illustrating a state of plate-like talc filler particulates 44 in the sealing material 40. The filler particulates 44 are non-uniformly distributed in epoxy resin 42, and three filler particulates overlap at a position 46 where the thickness of the epoxy resin is very thin. Consider a simplified model where a resin layer having dielectric constant Er and thickness dr, and a filler layer having dielectric constant Ef and thickness df are laminated. Assuming that the capacitance of the resin layer is Cr, a voltage applied across the resin layer is Vr, the capacitance of the filler layer is Cf, a voltage applied across the filer layer is Vf, the area is S, and V=Vr+Vf, then, since Q=Cr·Vr= Cf·Vf, Cr=Eo·Er·S/dr and Cf=Eo·Ef·S/df (Eo is a dielectric constant in vacuum), the following relationship can be obtained:

Vr:Vf=Cf:Cr=(Ef/df):(Er/dr)

The voltage applied across the resin is proportional to the ratio R(Vr)=Vr/V=Vr/(Vr+Vf).

R(Vr)=(Ef/df)/[(Ef/df)+(Er/dr)]=(Ef·dr)/(Ef·dr+Er·df)

The voltage applied across the resin of unit thickness is proportional to ratio R(Vr)/dr.

R(Vr)/dr=Ef/(Ef·dr+Er·df)=1/[dr+(Er·df/Ef)]

Therefore, the voltage applied across the resin of unit thickness is increased as the dielectric constant Ef of the filler becomes greater, and the thickness dr of the resin becomes smaller. Of course, the simplified model does not correspond to the actual sealing material, but can be regarded as representing a tendency in the characteristic. The thin epoxy resin portion at the position 46 will have a greater potential difference per unit thickness than that of other epoxy resin portions. In addition, the lowest filler particle has a small protrusion at the position 46. It is considered that the very thin resin layer at the position 46 itself, or in combination with other factors, such as the small protrusion on the filler, forms a "peculiar point" in the sealing material, which can induce an electrostatic discharge. The discharge will pass through the resin at the position 46 and travel along the surface of the filler. If such a "peculiar point" is formed by the alumina filler of variable shape, an electrostatic discharge can occur.

If the size of the high dielectric filler is reduced and the filler is uniformly distributed throughout the resin sealing material, the above mentioned electrostatic discharge will be prevented. In this case, however, there is deterioration of the capability to control the shape of the sealing material. Also, if the silicon nitride layer 30 in FIG. 5 is formed sufficiently thicker than 2000 Å, the electrostatic discharge will be prevented, even with the structure in FIG. 5. However, the employment of a thick insulating layer 30 is not preferable because longer time will be required for the deposition and patterning processing. Therefore, there is a demand for a solution that makes it possible to easily avoid the electrostatic discharge problem, even when a high dielectric constant filler, in particular, a plate-like filler, having a superior shape controllability is employed.

Japanese Unexamined Patent Publication No. (Patent Kokai No.) 08-29794 (1996) discloses a liquid crystal display device which uses a sealing material consisting of an electrically conductive resin in order to prevent destruction due to an electrostatic discharge.

Japanese Unexamined Patent Publication No. (Patent Kokai No.) 09-152620 (1997) discloses a liquid crystal display device which uses a combination of a sealing material containing electrically conductive spacers and a shunt transistor to prevent destruction due to an electrostatic discharge.

Japanese Unexamined Patent Publication No. (Patent Kokai No.) 05-134261 (1993) discloses a liquid crystal display device that prevents a short-circuit between a common electrode and exposed data lines, which occurs through conductive foreign materials that are mixed in a sealing material or attached to the surface of the sealing material. The wiring route of the data lines located between the sealing material and an insulating film is changed so that they pass under the insulating film at the position of the sealing material, and thus do not contact the sealing material. This prior art, however, does not take into consideration an electrostatic discharge that occurs inherent to a high dielectric constant filler in the sealing material. The short-circuit due to the conductive foreign materials can be eliminated by removing the foreign materials, or by covering the exposed data lines with a thin insulating layer. The problem with the electrostatic discharge that the present invention intends to overcome, however, can not be solved by removing conductive foreign materials from the sealing material, or by covering the data lines with a thin insulating layer.

It is, therefore, one object of the present invention to provide a liquid crystal display device that can solve the electrostatic discharge problem resulting from a high dielectric constant filler that is appropriate for the improved shape stability of a sealing material.

SUMMARY OF THE INVENTION

A liquid crystal display device according to the present invention comprises an array substrate, an opposing substrate and a sealing material. The array substrate includes a support substrate; a plurality of display electrodes or pixel electrodes formed on the support substrate; thin-film transistors (TFTs) formed on the support substrate, each of which have one current-conducting electrode connected to an associated display electrode; gate lines connected to gate electrodes of the TFTs; data lines connected to the other current-conducting electrodes of the TFTs; and an insulating layer disposed between the gate lines and the data lines. The opposing substrate includes a common electrode and is disposed opposite the array substrate at a predetermined distance. The sealing material is disposed between the array substrate and the opposing substrate and surrounds a display area that includes the display electrodes and the TFTs. A liquid crystal material is disposed in the display area. The insulating layer has a first surface on the side of the sealing material and a second surface on the side of the support substrate and extends outward beyond the location of the sealing material. One of the gate lines and the data lines lie on the second surface of the insulating layer, and extend beyond the location of the sealing material to a first terminal connecting position of the array substrate. The other lines lie on the first surface of the insulating layer in the display area and extend beyond the location of the sealing material to a second terminal connecting position of the array substrate. The sealing material includes a resin material and a plate-like or variable-shape inorganic dielectric filler having a dielectric constant greater than that of the resin material. The other lines on the first surface of the insulating layer are led through vias to the second surface before they reach the location of the sealing material, and extend outward between the insulating layer and the support substrate at least until they are beyond the location of the sealing material.

Said other lines may be led from the second surface of the insulating layer to the first surface through vias at positions beyond the sealing material. The filler is preferably selected from the group consisting of talc, alumina and mica. In addition, said other lines are preferably covered with a protective layer such as silicon nitride that extends outward beyond the location of the sealing material.

BRIEF DESCRIPTION OF THE DRAWINGS

Preferred embodiments of the present invention will n be described, by way of example only, with reference to the accompanying drawings in which.

DETAILED DESCRIPTION OF THE PREFERRED EMBODIMENTS OF THE INVENTION

Figure 1A:
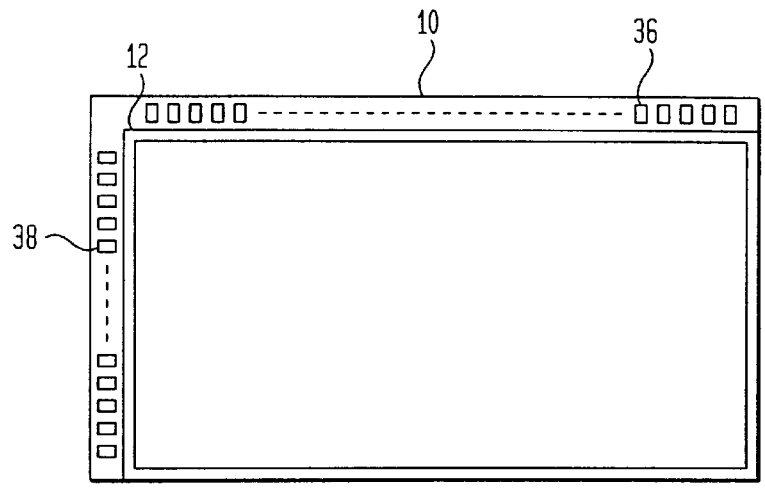
FIGS. 1(A) and 1(B) are a top view and a side view of a liquid crystal display device.
Figure 1B:
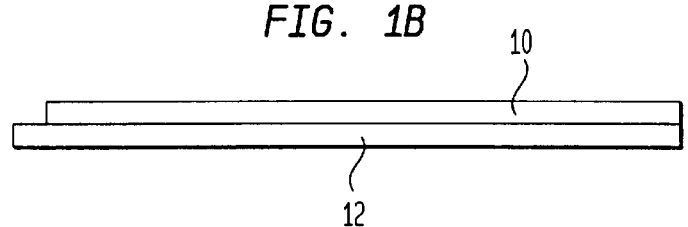
Figure 2:
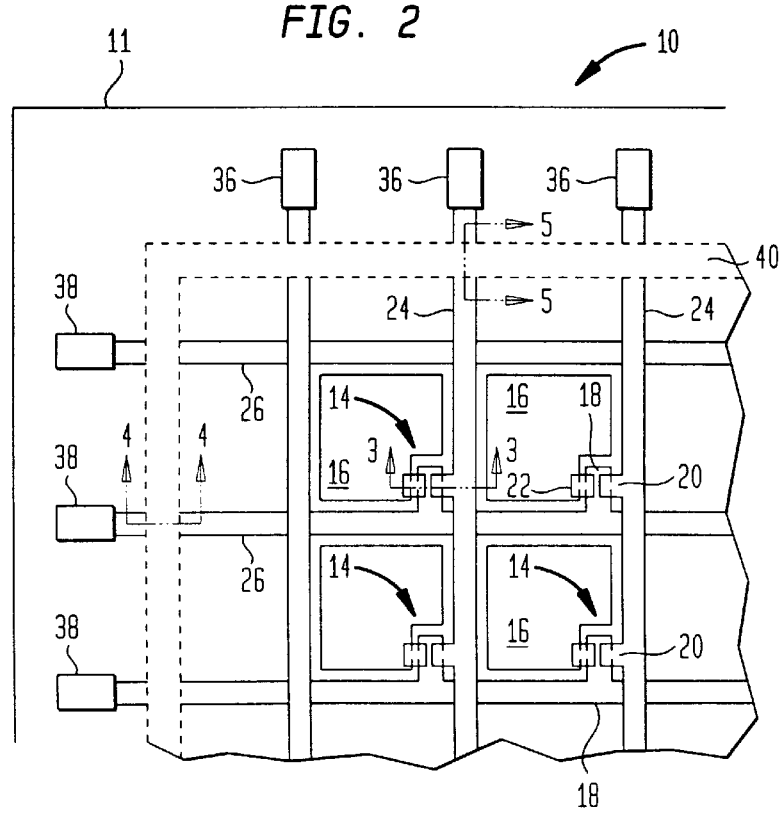
FIG. 2 is a diagram illustrating the structure of an array substrate of the liquid crystal display device.
Figure 3:
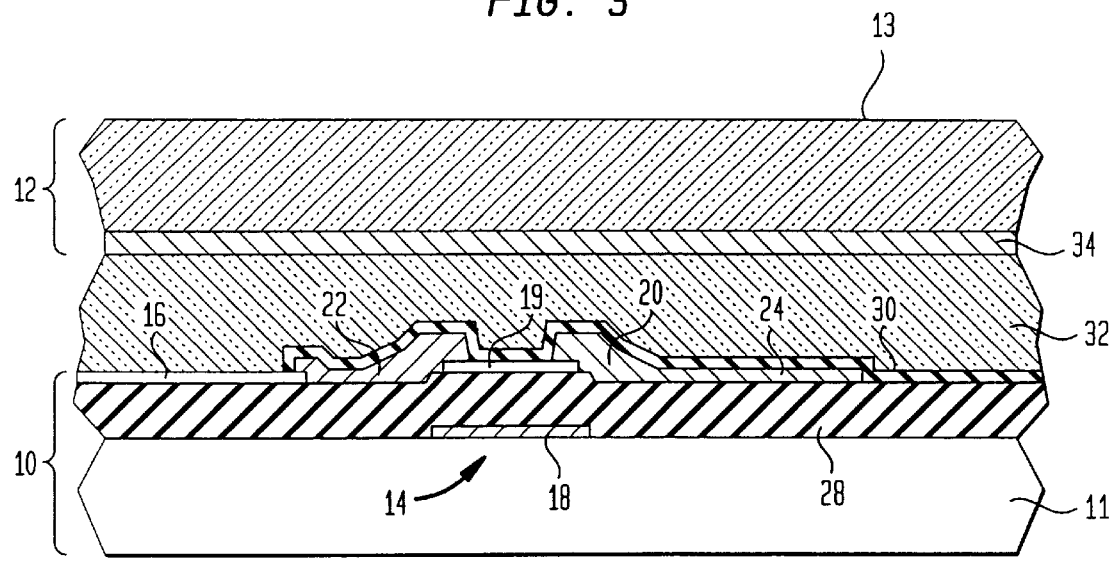
FIG. 3 is a cross-sectional view of the liquid crystal display device at a position indicated by an arrow tipped line 3—3 in FIG. 2.
Figure 4:
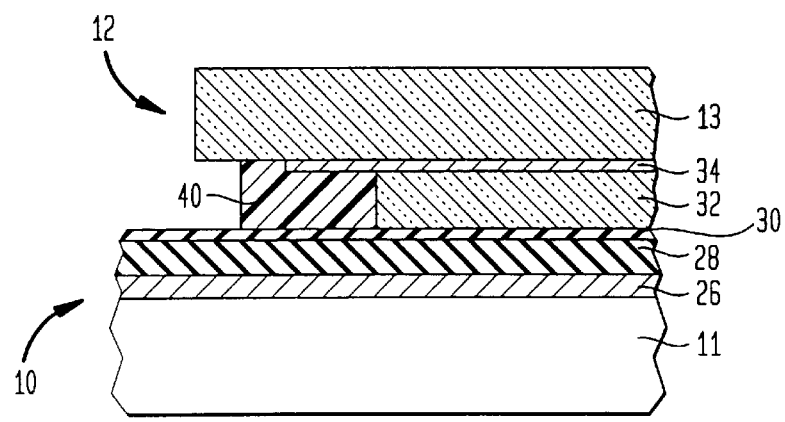
FIG. 4 is a cross-sectional view of the liquid crystal display device at a position indicated by an arrow tipped line 4—4 in FIG. 2.
Figure 5:
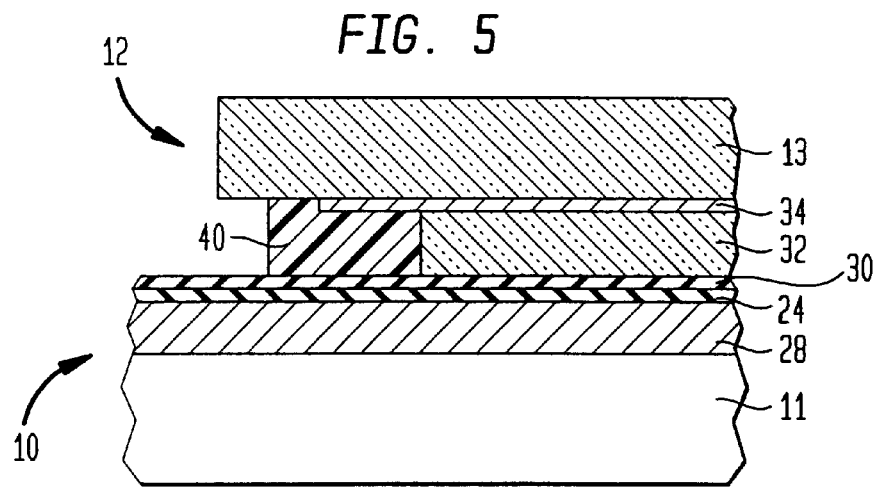
FIG. 5 is a cross-sectional view of the liquid crystal display device at a position indicated by an arrow tipped line 5—5 in FIG. 2.
Figure 6:
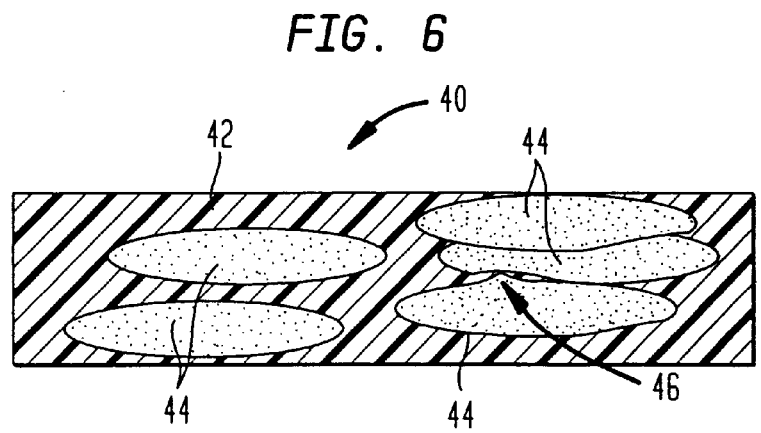
FIG. 6 is a diagram illustrating a state of filler in the sealing material.
Figure 7:
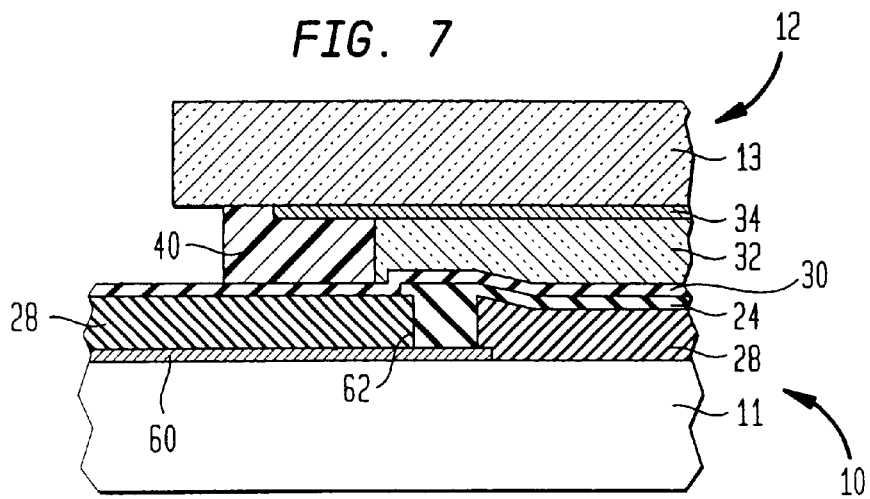
FIG. 7 is a cross-sectional view of a liquid crystal display device according to the present invention at a position corresponding to the position indicated by the arrow tipped line 5—5 in FIG. 2.

FIG. 7 is a cross-sectional view, taken at a position indicated by an arrow delimited line 5—5 in FIG. 2, of the structure of a liquid crystal display device according to one embodiment of the present invention. This structure corresponds to that in FIG. 5. The remaining structure may be the same as that in FIGS. 2 and 3. In the present invention, a pattern of conductive lines 60 that extend vertically across the sealing material 40 is formed on a glass support substrate 11 at the same time as the gate electrodes 18 and gate lines 26 (FIGS. 2 and 3) are formed on the substrate 11. The material for the conductive lines 60 may be the same as that for the gate electrodes 18 and the gate lines 26. To form the conductive lines 60, the gate electrodes 18, and the gate lines 26, for example, an Mo—W alloy layer is deposited on the entire surface of the support substrate 11 by sputtering, and then patterned using photo lithographic masking and etching. The conductive lines 60 are formed correspondingly to the data lines 24.

After the gate electrodes 18, the gate lines 26 and the conductive lines 60 are formed, a silicon oxide layer 28 which acts as a gate insulating layer and a lower protective insulating layer is deposited. The oxide layer 28 is deposited to a thickness, for example, of 3000 Å and extends outward beyond the location of the sealing material 40. Following this, via holes 62 are formed in the oxide layer 28 using photo lithographic masking and etching in order to expose the ends of the conductive lines 60 on the side of the display area.

Using well known processes, an array of display electrodes or pixel electrodes 16, composed of ITO, is formed on the oxide layer 28, and a semiconductor layer 19, composed, for example, of amorphous silicon, is formed above each of the gate electrodes 18. Following this, a composite layer consisting of an Mo underlayer, an Al intermediate layer, and an upper Mo layer is deposited across the entire surface of the structure. The composite layer is then patterned using photo lithographic masking and etching to form source electrodes 22, drain electrodes 20, and data lines 24. The respective source electrode 22 is connected to its associated pixel electrode 16 and semiconductor layer 19, and the respective data line 24 and associated drain electrodes 20 are integrally formed. The respective data line 24 is connected to the associated conductive line 60 through the via hole 62. The data lines 24 are patterned so as not to reach the location of the sealing material 40.

Next, excluding the area of the pixel electrodes 16, an upper protective insulating layer 30, such as silicon nitride, is formed across the surface.

The upper protective silicon nitride layer 30 is deposited to a thickness of 1000 Å, for example, and extends outward beyond the location of the sealing material 40.

As well known, a color filter (not shown) and a common electrode 34 made of ITO are formed on a glass support substrate 13 to provide an opposing substrate 12. Then, a sealing epoxy resin material containing glass filament spacers and an inorganic dielectric filler is extruded and applied on the opposing substrate 12 by a seal application device. The array substrate 10 is positioned on the opposing substrate 12, and pressed down to compress the sealing material. The sealing material 40 is formed so that it positionally overlaps the common electrode 34. Since the sealing material 40 contains glass filament spacers that have a diameter corresponding to the size of a gap between the array substrate 10 and the opposing substrate 12 (e.g., spacers having a diameter of 5 μm and a length of 10 to 20 μm for a gap of 5 μm), desirable spacing is defined between the array substrate 10 and the opposing substrate 12. Actually, minute spacers having a height of 5 μm are also disposed in the display area in order to retain the spacing in the display area. Finally, liquid crystal is introduced into the area surrounded by the sealing material 40. Although not shown in the drawings, a liquid crystal molecule alignment film of polyimide is formed on the surfaces of the array substrate 10 and the opposing substrate 12.

The particulate filler will now be described. It is preferable that an inorganic dielectric filler of plate-like shape, or variable or irregular shape, be used in order to improve the shape stability of the sealing material 40 at the time of its application and after it has been pressed. A plate-like filler is especially preferable. The term "plate-like" indicates a shape in which the transverse dimension, i.e., the size in the direction perpendicular to the direction of the thickness, is greater than the thickness, and the surfaces are not necessarily required to be flat. When a plate-like filler is too small, compared with the gap between the substrates, preferable shape controllability can not be obtained. To obtain good shape controllability, preferably the thickness of the plate-like filler is approximately 0.2 G to 0.4 G for the gap length G between the substrates, and the transverse dimension of approximately 1 G to 4 G. When the gap length G is 5 $\mu$m, a plate-like filler having the thickness of approximately 1 to 2 $\mu$m and the transverse dimension of approximately 5 to 20 $\mu$m is preferable.

Talc (having a dielectric constant of approximately 9) or mica (having a dielectric constant of approximately 6 to 9) can be employed for the plate-like filler, and the Talc is preferable. Alumina (having a dielectric constant of approximately 8 to 10) can be used for the filler of variable shape. Preferably, the average size of alumina particles is in the order of 3 $\mu$m. Generally, a filler of 10 to 50 weight % is mixed in the resin.

As is shown in FIG. 7, a silicon nitride layer 30 having a thickness of 1000 Å and a silicon oxide layer 28 having a thickness of 3000 Å exist between the sealing material 40 and the conductive lines 60, and an electrostatic discharge can be effectively prevented. While the upper insulating layer 30 can have an arbitrary thickness, generally, the thinner it is the better it is, so long as it can serve as an upper protective layer. While the lower insulating layer can also have an arbitrary thickness, the important consideration is that the total thickness of the upper and the lower insulating layers be sufficient to prevent an electrostatic discharge. A total thickness in the order of 3000 Å will be satisfactory. If design conditions allow, the upper insulating layer could be eliminated. In this case, the lower insulating layer must have a sufficient thickness to prevent an electrostatic discharge by itself.

Figure 8:
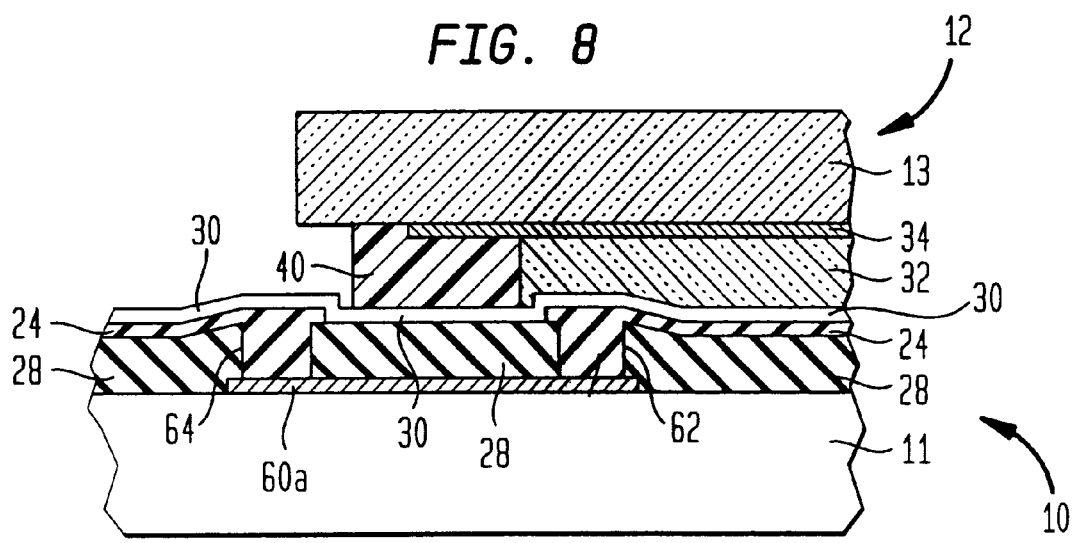
FIG. 8 is a diagram illustrating a structure according to another embodiment of the present invention.

FIG. 8 is a diagram illustrating another embodiment of the present invention. The structure in FIG. 8 is the same as that in FIG. 7, with the exception that conductive lines 60a are terminated at a position beyond the sealing material 40. The data lines 24 and the ends of the conductive lines 60a are connected together by means of via holes 64 in the lower insulating layer 28 at a position beyond the sealing material 40, so that the conductive lines 60a are led to the surface of the lower insulating layer 28 opposite the support substrate 11.

Specific examples have been explained above, but it will be obvious that various modifications can be employed. While TFTs having the inverted staggered structure have been used in the above embodiments, the present invention can be applied to a liquid crystal display device that employs top gate TFTs that have a gate electrode on a semiconductor layer. In this case, the positions of the data lines and of the gate lines need only be exchanged, with the gate lines being connected as is shown in FIG. 7 or 8. Furthermore, the present invention can be applied to a liquid crystal display device that employs, as a sealing material, a resin having a dielectric constant similar to that of epoxy resin, i.e., a polyimide resin. In addition, the present invention can be applied not only to a liquid crystal display device employing an upper insulating silicon nitride layer, but also to a liquid crystal display device that employs, as an upper insulating layer, any other known inorganic or organic insulating layer to prevent the occurrence of an electrostatic discharge.

While the invention has been particularly shown and described with respect to preferred embodiments thereof, it will be understood by those skilled in the art that the foregoing and other changes in form and details may be made therein without departing form the spirit and scope of the invention.

Having thus described my invention, what I claim as new, and desire to secure by Letters Patent is:

1. A liquid crystal display device having electrostatic discharge prevention, said device comprising:

an array substrate including a support substrate, a plurality of display electrodes formed on said support substrate, thin-film transistors (TFTs) formed on said support substrate, each TFT having one current-conducting electrode connected to an associated display electrode, a gate line connected to a gate electrode of said TFTs, a data line connected to another current-conducting electrode of said TFTS, and an insulating layer disposed between said gate line and said data line;

an opposing substrate, having a common electrode, disposed opposite said array substrate at a predetermined distance;

a sealing material, disposed between said array substrate and said opposing substrate, surrounding a display area which includes said display electrodes and said TFTs; and a liquid crystal material disposed in said display area, wherein said insulating layer has a first surface on the side of said sealing material and a second surface on the side of said support substrate, and extends outward beyond the location of said sealing material, one of said gate line and said data line lying on said second surface of said insulating layer extending outward beyond said location of said sealing material for connection with a first terminal of said array substrate, and the other of said gate line and said data line lying on said first surface of said insulating layer in said display area and including a first portion extending toward said sealing material location and terminating prior thereto, and a second portion located beyond said sealing material location and extending outward therefrom for connection with a second terminal of said array substrate, said sealing material including a resin material, and a plate-like or variable-shape inorganic dielectric filler having a dielectric constant greater than that of said resin material; said device further comprising:

an associated conducting line formed between said second surface and said support substrate from a location before said sealing material location and extending to a location beyond said sealing material location; and first and second via connections for connecting respective said first and second portions of said other of said gate line or data line at said first surface to said associated conducting line at respective locations before and beyond said sealing material location.

2. The liquid crystal display device according to claim 1, wherein said filler is plate-like.

3. The liquid crystal display device according to claim 1, wherein said display electrodes are an array of pixel electrodes.

4. The liquid crystal display device according to claim 1, wherein said first and second via connections penetrate said insulating layer at locations before and beyond said location of said sealing material.

5. The liquid crystal display device according to claim 1, wherein said other of said gate line or data line at said first surface is covered with a protective layer that extends outward beyond said location of said sealing material.

6. The liquid crystal display device according to claim 2, wherein said filler is selected from the group consisting of talc, alumina and mica.

7. The liquid crystal display device according to claim 2, wherein said filler is selected from the group consisting of talc and mica.

8. The liquid crystal display device according to claim 2, wherein the thickness of said filler is 0.2 G to 0.4 G (G is a distance between said array substrate and said opposing substrate), and the transverse dimension in the direction perpendicular to the direction of the thickness is 1 G to 4 G.

9. The liquid crystal display device according to claim 2, wherein the thickness of said filler is 1 $\mu$m to 2 $\mu$m, and said transverse dimension is 5 $\mu$m to 20 $\mu$m.

10. The liquid crystal display device according to claim 5, wherein said protective layer is a silicon nitride layer.

11. The liquid crystal display device according to claim 9, wherein the thickness of said silicon nitride layer is equal to or less than 2000 Å.

* * * * *